Nov. 13, 1962  D. F. COOK  3,063,533
FEED TABLE
Filed Oct. 27, 1960  2 Sheets-Sheet 1
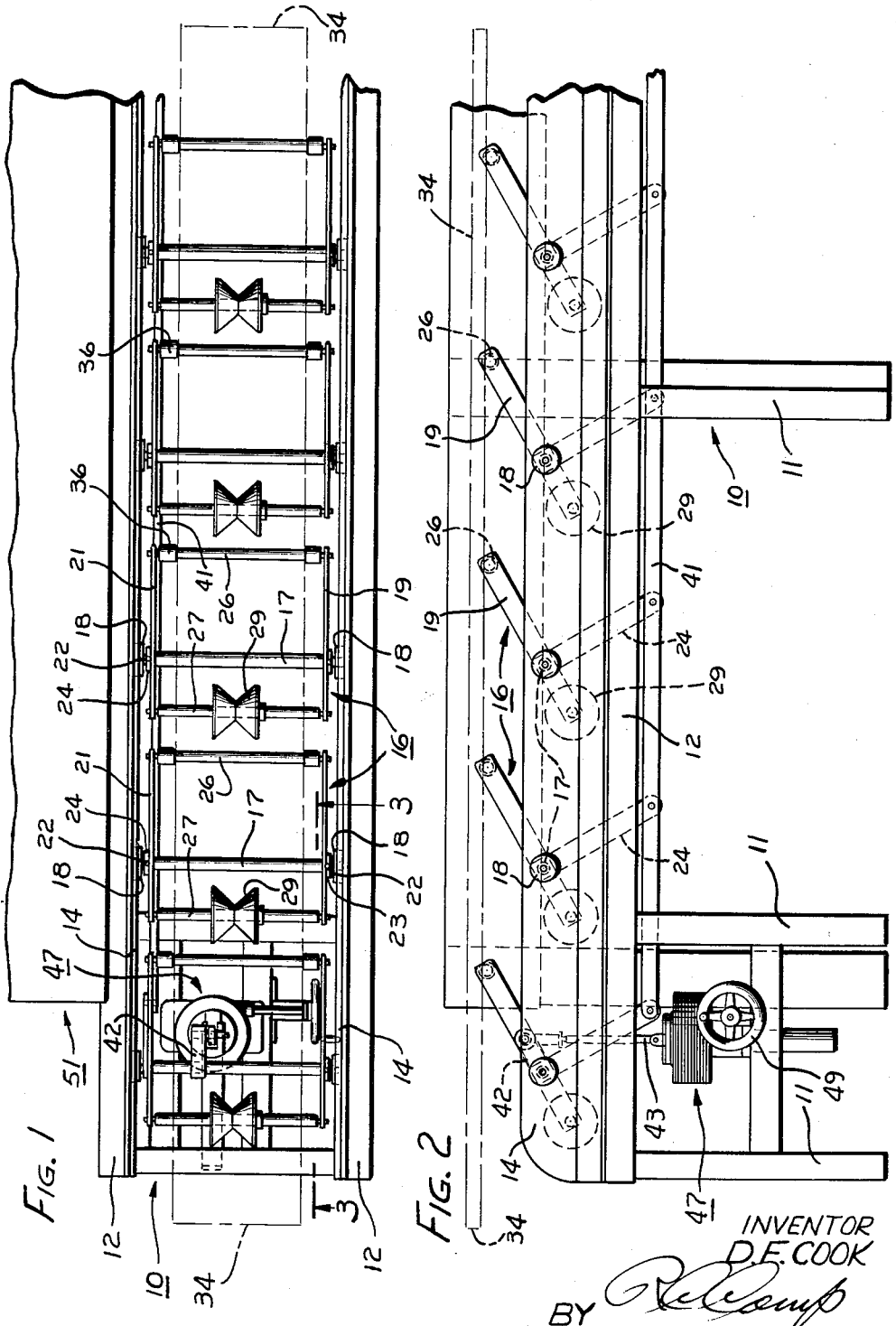
INVENTOR
D.F. COOK
BY
ATTORNEY Nov. 13, 1962   D. F. COOK   3,063,533
FEED TABLE
Filed Oct. 27, 1960   2 Sheets-Sheet 2
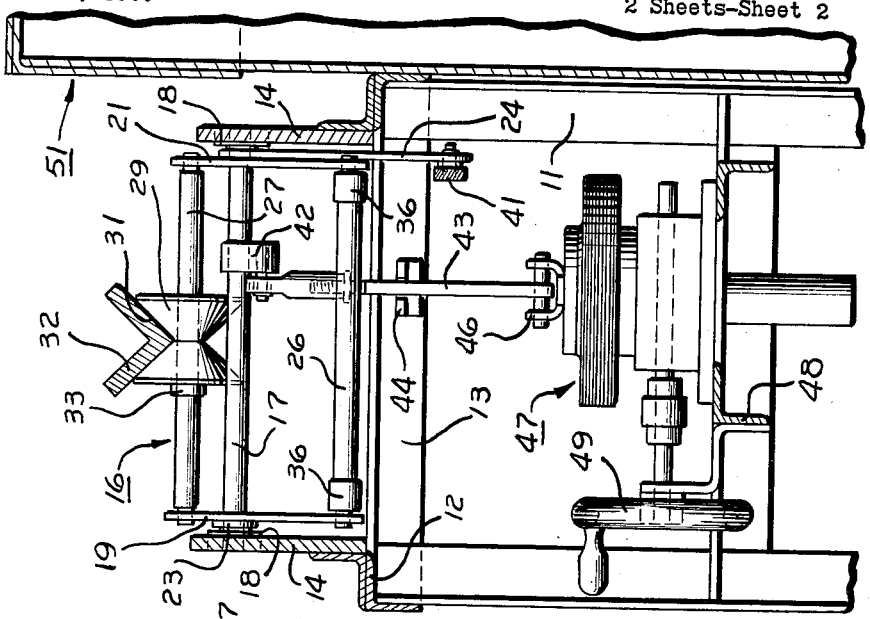
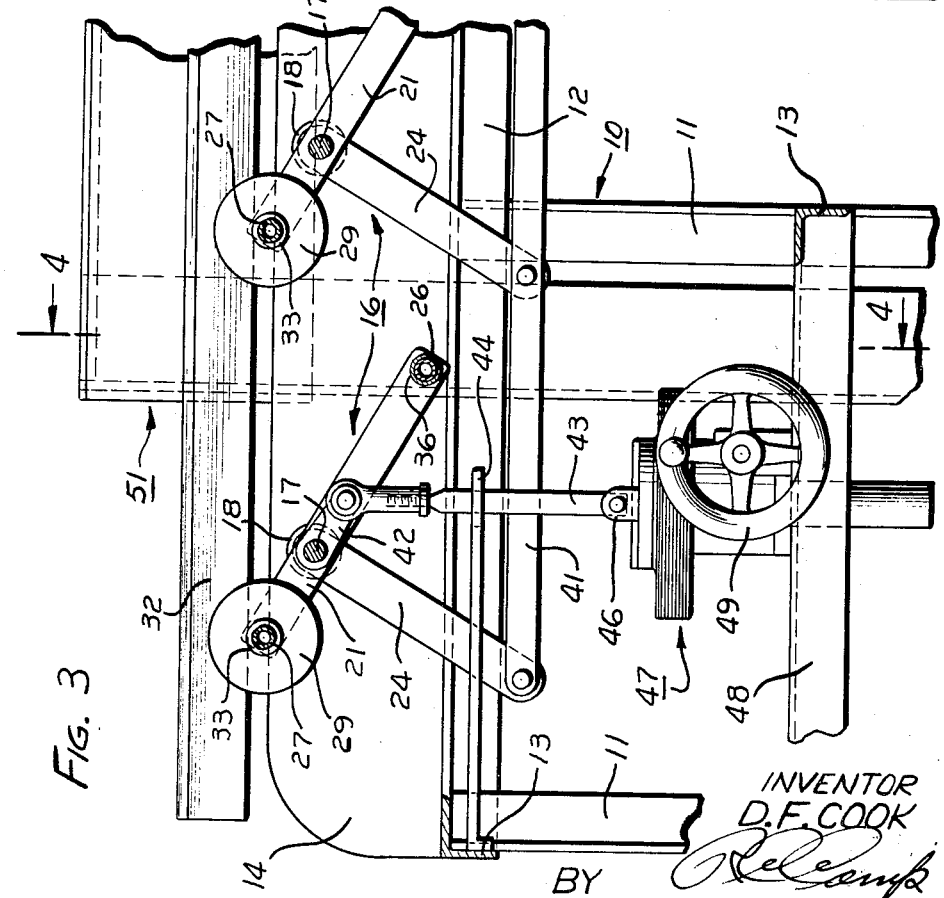
INVENTOR
D.F. COOK
BY
ATTORNEY

United States Patent Office 3,063,533
Patented Nov. 13, 1962

3,063,533
FEED TABLE
Donald F. Cook, Addison, Ill., assignor to Western Electric Company, Incorporated, a corporation of New York
Filed Oct. 27, 1960, Ser. No. 65,366
3 Claims. (Cl. 193—35)

This invention relates to feed tables, and more particularly to a roller feed table for the alternate feeding and guiding of articles of dissimilar cross-sectional shapes to a processing station.

It is standard practice in certain manufacturing operations to feed stock material through a suitable set of shearing dies to sever the stock into predetermined lengths. Normally the stock material, regardless of its cross-sectional shape, is supported on a feed table and is guided into the shearing dies by hand. Further, since the height of one set of shearing dies relative to the feed table will often be different than that of another set for shearing a different size or type of stock, the feed table is provided with vertically adjustable legs for varying the height of the table according to the height of the dies being used.

The foregoing arrangement is undesirable, especially where the stock material is heavy or elongated, or of other than flat sheet stock, because it is difficult for the operator handling the stock initially to align the stock and subsequently to maintain it aligned in the dies, and to move it along the feed table through the dies. In this regard, the feeding of angle bar stock is especially difficult since the construction of the dies for severing this stock requires that it be fed into the dies substantially with the vertex of the angle bar directed downwardly. Further, unless some relatively complicated and expensive mechanism is utilized whereby the legs on the feed table can be adjusted simultaneously, the positioning of the feed table vertically relative to the shearing dies to any degree of accuracy is relatively difficult and unduly time consuming.

An object of this invention is to provide a new and improved feed table for the alternate feeding and guiding of articles of dissimilar cross-sectional shapes to a processing station.

A further object of this invention is to provide a new and improved feed table which readily can be converted for the alternate feeding and guiding of articles of dissimilar cross-sectional shapes to a processing station in precise alignment with a processing tool.

Another object of this invention is to provide a new and improved feed table which is simple in construction and operation.

A further object of this invention is to provide a new and improved roller type feed table.

A still further object of this invention is to provide a new and improved feed table which readily may be converted and adjusted for the alternate feeding and guiding of articles of dissimilar cross-sectional shapes to a processing station at varying elevations as desired.

With these and other objects in view, the present invention contemplates a feed table including a plurality of carriers or roller carrying frames which are mounted for rotation about parallel horizontal axes, and upon each of which first and second stock or article supporting rollers are mounted in spaced parallel relationship. The carriers are rotatable between a first position in which the first rollers are in a stock feeding position and a second position in which the second rollers are in a stock feeding position. The first rollers are adapted to support and guide one type of stock material and the second rollers are adapted to support and guide stock material having a dissimilar cross-sectional shape from the first type, while the stock material is fed to a set of shearing dies. The carriers are interconnected by linkage for rotation between their first and second positions in unison, whereby the feed table readily may be converted for the alternate feeding of one or the other of the different types of stock material, and whereby the operating elevation of the rollers may be adjusted as desired.

Other objects, advantages and novel features of the invention will become apparent upon consideration of the following detailed description in conjunction with the accompanying drawings wherein:

FIG. 1 is a plan view of a portion of a roller feed table constructed according to the present invention in a first operating position;

FIG. 2 is an elevational view of the roller feed table shown in FIG. 1;

FIG. 3 is an enlarged cross-sectional view taken substantially along the line 3—3 of FIG. 1, showing the feed table in a second operating position; and FIG. 4 is a cross-sectional view taken substantially along the line 4—4 of FIG. 3.

As shown in the drawings, the illustrated embodiment of a roller feed table constructed according to the present invention includes a frame 10 made up of vertical posts 11, longitudinal members 12 and transverse cross-braces 13, all of suitable stock material. The top of the frame 10 has a pair of horizontally extending spaced parallel side plates 14 bolted thereto.

The side plates 14 have a plurality of longitudinally spaced rotatable carriers or roller carrying frames 16 disposed therebetween. The carriers 16 each are supported on a shaft 17 rotatably mounted in bearings 18 in the side plates 14, the shafts 17 being horizontal and parallel to one another. In this regard, the carriers 16 each include a pair of transversely spaced elongated roller carrying arms 19, 21, which are connected by pins 22 (FIG. 1) to opposite ends of each of the shafts 17 for rotation therewith. As shown in FIGS. 1 and 4, portions of the arms 19 adjacent their connection to the shafts 17 are reinforced by blocks 23 welded to the sides of the arms, while similar portions of the arms 21 are reinforced by lugs 24 welded thereto, the lugs extending downwardly therefrom for a purpose subsequently to be described.

The opposite ends of each of the pairs of arms 19, 21 have cylindrical rollers 26 and 27 rotatably mounted therebetween. The cylindrical rollers 27 each carry a roller 29 which, as shown in FIG. 4, has a peripheral V-groove 31 formed therein for receiving and supporting a piece of angle bar stock 32 during a feeding operation. The V-grooved rollers 29 are slidably adjustable along the length of the cylindrical rollers 27 and may be locked in any desired position thereon by means of set screws threaded through sleeve portions 33 integral with the V-grooved rollers and projecting laterally therefrom.

The cylindrical rollers 26 are adapted to receive and support a piece of flat sheet stock 34 during a feeding operation, as shown in FIGS. 1 and 2. If desired the cylindrical rollers 26 may be provided with sleeve members 36 adjacent their opposite ends to preclude lateral displacement of the sheet material during the feeding operation. The sleeve members 36, where used, preferably are held in position on the rollers 26 by set screws, so as to be adjustable for accommodating different widths of stock.

The carriers 16 are selectively rotatable between a first position, as shown in FIGS. 1 and 2, in which the cylindrical rollers 26 are in a stock supporting position, and a second position, as shown in FIGS. 3 and 4, in which the V-grooved rollers 29 are in a stock supporting position. Thus, the feed table readily may be converted for the alternate feeding of either sheet stock 34 (FIGS. 1 and 2) or angle bar stock 32 (FIGS. 3 and 4) to a set of shearing dies (not shown) by rotating the carriers 16 between their first and second positions.

Mechanism is provided so that the carriers 16 readily may be rotated between their first and second positions as shown in FIGS. 1 and 2 and FIGS. 3 and 4, respectively. In this regard, the downwardly projecting lugs 24, which are welded to the arms 21 as noted hereinabove, are pivotally connected at their lower free ends to a link 41, the link 41 connecting the lugs to one another for movement in unison. A crank arm 42 is pinned or otherwise suitably secured at one of its ends to the shaft 17 adjacent the left end of the feed table, as viewed in FIGS. 1 and 3, and the other end of the crank arm is pivotally connected to a vertically disposed link 43. The link 43 is held in position for vertical reciprocating movement by a guide member 44 (FIGS. 3 and 4) secured to an end cross-brace 13, and the lower end of the link 43 is pivotally connected to a vertically movable member 46 of a commercial worm-gear jack 47. The worm-gear jack 47 is supported on angle bars 48 secured at their opposite ends to a pair of the transverse cross-braces 13, and includes a rotatable operating crank 49. Upon rotation of the crank 49, vertical movement is imparted to the link 43 through the member 46 to move the assembly 24, 41, 42, whereby the carriers 16 may be rotated between their first and second positions in unison.

In operation, the feed table is positioned adjacent and secured to a stock table 51. Assuming sheet stock is to be fed on the feed table, the carriers 16 are rotated by operation of the crank 49 to place the cylindrical rollers 26 in a stock feeding position and at an elevation such that stock supported on the rollers will be in vertical alignment with the shearing dies. The sleeve members 36, if such are being used, are adjusted on the cylindrical rollers 26 so as to receive the sheet stock 34 therebetween in substantially engaging relationship. The sheet stock 34 may then be removed manually from the stock table 51 and placed on the rollers 26 in the position shown in FIGS. 1 and 2 and pushed along the rollers and through the shearing dies.

When it is desired to feed angle bar stock, the sheet stock shearing dies are replaced with suitable dies for severing angle bar stock, and the carriers 16 are rotated by operating the crank 49 to bring the V-grooved rollers 29 into a proper stock feeding position vertically relative to the dies, as shown in FIGS. 3 and 4. The V-grooved rollers 29 then are adjusted laterally on the cylindrical rollers 27 to align the V-grooves 31 with the shearing dies in a transverse direction, whereupon angle bar stock 32 may be fed as described hereinabove with regard to the sheet stock 34.

While the carriers 16 have been shown with cylindrical rollers 26 and V-grooved rollers 29 mounted thereon, it is apparent that other types of rollers could be used depending upon the cross-sectional shape of the stock material which is to be fed, and that rotatable guide members other than rollers could be used, with some loss in the ease of feeding of the stock material. Further, it is contemplated that the carriers 16 could take other forms than that shown and that three or more rollers or guide members could be mounted on each carrier.

From the foregoing description it is apparent that a new and improved device has been provided which obviously accomplishes the desired objects. The cylindrical rollers 26 and V-grooved rollers 29, being supported in spaced parallel relationship on the rotatable carriers 16, readily can be moved into and out of their stock feeding position by merely rotating the carriers, whereby the feed table readily can be converted for the alternate feeding of either sheet stock or angle bar stock, respectively. The lugs 24, link 41, crank arm 42, link 43 and worm-gear jack 47 provide a simple and inexpensive mechanism whereby this rotation of the carriers 16 may be accomplished in a rapid and efficient manner, and further inherently provide a means for adjusting the elevation of the rollers 26 and 29 relative to the shearing dies. This adjustment, in cooperation with the adjustable sleeve members 36 (where used) and the laterally adjustable V-grooved rollers 29, permits exact alignment of the stock material relative to the shearing dies so that the rollers 26 and 29 can be used to guide the stock material as it is fed into and through the dies, with a minimum of effort on the part of the operator.

It is to be understood that the above-described arrangements are simply illustrative of the application of the principles of this invention. Numerous other arrangements readily may be devised by those skilled in the art which will embody the principles of the invention and fall within the spirit and scope thereof.

What is claimed is:

1. In apparatus for the alternate feeding of first and second articles of dissimilar cross-sectional shapes to a processing station, a plurality of rotatable members of such cross-sectional configuration as to be adapted to support and guide the first articles for feeding movement with respect thereto, a plurality of rotatable members of such cross-sectional configuration as to be adapted to support and guide the second articles for feeding movement with respect thereto, a plurality of rotatable frames each supporting one each of said supporting and guiding members, said supporting and guiding members and said frames being rotatable about horizontal parallel axes, and means drivingly connecting said frames to one another for rotating said frames in unison between first positions in which said first-mentioned members are positioned to support and guide the first articles, and second positions in which said second-mentioned members are positioned to support and guide the second articles.

2. In apparatus for the alternate feeding of first and second articles of dissimilar cross-sectional shapes to a processing station, a plurality of roller members of such peripheral configuration as to be adapted to support and guide the first articles for feeding movement with respect thereto, a plurality of roller members of such peripheral configuration as to be adapted to support and guide the second articles for feeding movement with respect thereto, a plurality of rotatable frames each supporting one each of said supporting and guiding roller members, said roller members and said frames being rotatable about horizontal parallel axes, a link interconnecting said frames, and means for imparting movement to said link to rotate said frames in unison between first positions in which said first-mentioned roller members are positioned to support and guide the first articles, and second positions in which said second-mentioned roller members are positioned to support and guide the second articles.

3. In apparatus for the alternate feeding of first and second stock materials of dissimilar cross-sectional shapes to a processing station, a plurality of roller members of such peripheral configuration as to be adapted to support and guide the first stock material for feeding movement with respect thereto, a plurality of roller members of such peripheral configuration as to be adapted to support and guide the second stock material for feeding movement with respect thereto, a pair of spaced parallel frame members, pairs of spaced arms extending parallel to said frame members, each of said pairs of arms supporting one each of said supporting and guiding roller members between said arms and adjacent opposite ends of said arms, shafts rotatably mounted on said frame members and rigidly connected to said arms intermediate the opposite ends of said arms, said roller members and said shafts being rotatable about horizontal parallel axes, projecting parallel lugs rigidly connected to said arms, a link interconnecting said lugs, a crank arm secured to one of said shafts, and means for rotating said crank arm whereby said lugs and said link are moved to rotate said pairs of arms in unison between first positions in which said first-mentioned roller members are positioned to support and guide the first articles, and second positions in which said second-mentioned members are positioned to support and guide the second articles.

References Cited in the file of this patent

UNITED STATES PATENTS

| | | |
|---|---|---|
| 756,959 | Herman | Apr. 12, 1904 |
| 1,541,300 | White | June 9, 1925 |
| 1,728,538 | Gentil | Sept. 17, 1929 |